Feb. 22, 1927.
H. W. SANFORD
WHEEL AND AXLE
Filed Aug. 18, 1925   2 Sheets-Sheet 1
1,618,848
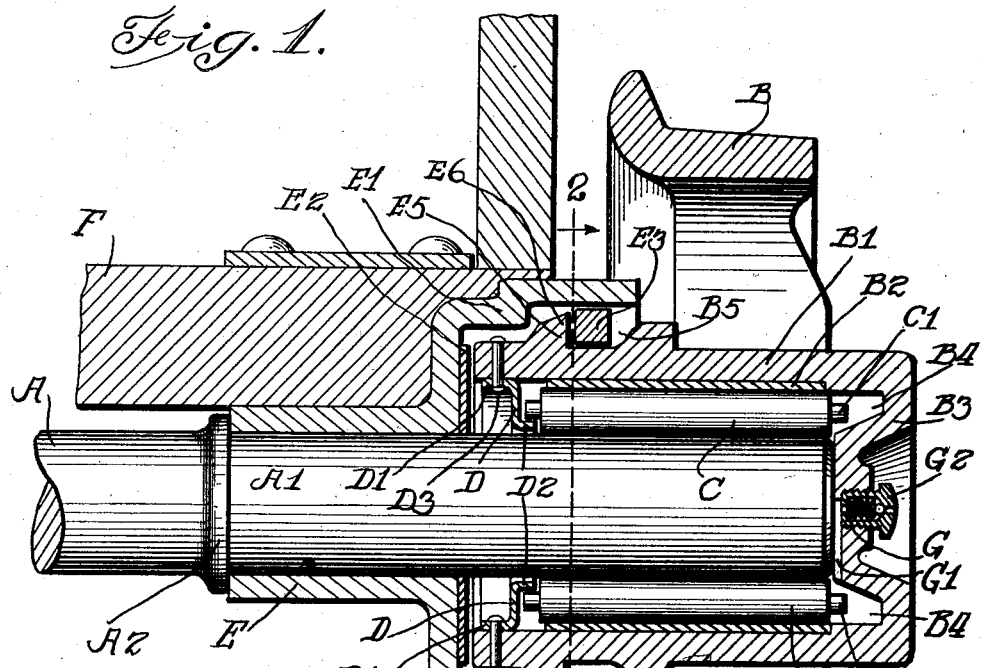
Fig. 1.
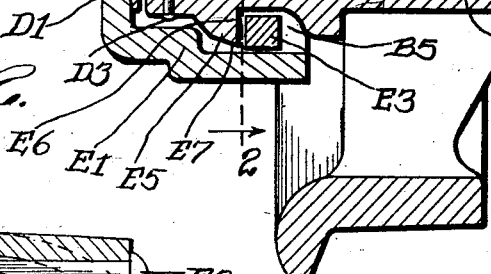
Fig. 2.
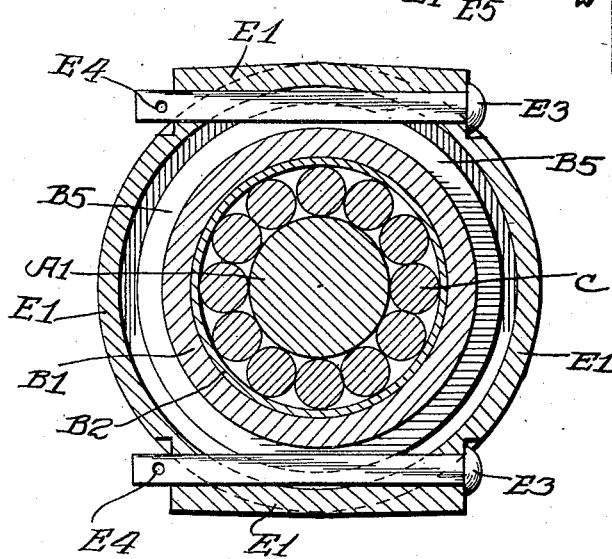
INVENTOR.
Hugh W. Sanford
BY
ATTORNEYS.

Feb. 22, 1927. 1,618,848

H. W. SANFORD

WHEEL AND AXLE

Filed Aug. 18, 1925  2 Sheets-Sheet 2

INVENTOR.
Hugh W. Sanford
BY Cyrus Kehr
ATTORNEYS.

Patented Feb. 22, 1927.

1,618,848

UNITED STATES PATENT OFFICE.

HUGH W. SANFORD, OF KNOXVILLE, TENNESSEE.

WHEEL AND AXLE.

Application filed August 18, 1925. Serial No. 51,065.

This invention relates particularly to a wheel and axle construction intended for heavy service. The invention is described herein as applied to wheels and axles for mine cars.

The object of the invention is to provide a construction containing ample provision for lubrication and also having durable means for holding the wheel against endwise movement on the axle while being free to rotate on the axle.

In the accompanying drawings,

Fig. 1 is an upright section along the axial line of a structure embodying a wheel and axle and roller bearing and a part of a mine car body;

Fig. 2 is a transverse upright section on the line, 2—2, of Fig. 1, looking toward the right;

Figure 3:
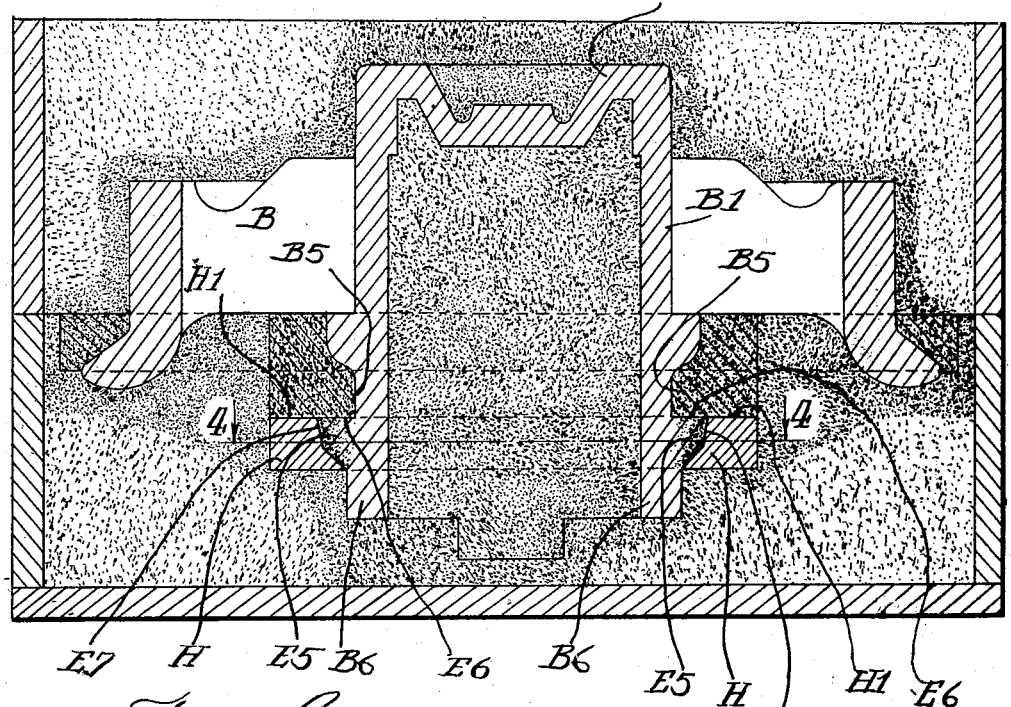
Fig. 3 is an upright axial section through a mold in which a wheel is cast.

Referring to Figs. 1 and 2 of said drawings, A is the axle. $A^1$ is one of the journals on the axle. $A^2$ is a shoulder formed on the axle at the inner end of the journal. B is a wheel having a bearing or hub, $B^1$. Within the hub is a tubular liner, $B^2$, which bears against the inner face of the hub and may be regarded as a part of the hub. The hub has an end wall, $B^3$, which bears against the end of the journal, $A^1$. The journal and the inner face of the liner, $B^2$, are spaced from each other a distance equalling the diameter of each of the rollers, C. These rollers are placed parallel to the journal and fill the annular space between the journal and the liner. The end wall, $B^3$, of the hub has an annular channel, $B^4$, concentric with the journal axis and opposite the outer ends of the rollers, C. The bodies of said rollers extend only to or nearly to the plane of the end of the journal; but each roller has on its adjacent end a wrist, $C^1$, extending into the channel, $B^4$.

At the other end of the hub and on its inner face is a ring, D, having a flange, $D^1$, bearing against the inner face of the hub and having a flange, $D^2$, extending between the journal and the wrists, $C^1$, of the rollers, C. Rivets, $D^3$, join the flange, $D^1$, to the hub.

An axle box, E, is secured in any manner to the car bottom, F, and extends around the journal between the shoulder, $A^2$, and the hub, $B^1$, and bears against the journal. Said box is expanded to make a flange, $E^1$, extending outward around and spaced from the hub, $B^1$, of the wheel. In the part of the hub which is surrounded by the flange, $E^1$, the hub has an external, circumferential channel, $B^5$. Above and below the hub, a key, $E^3$, extends horizontally through the flange, $E^1$, and tangentially through the hub channel, $B^5$, and is retained by a cotter, $E^4$. Said keys prevent the wheel and hub from moving horizontally outward away from the bearing box, E. While so serving, the keys bear against the adjacent upright face, $E^6$, of the annular flange or rib, $E^5$, of the hub which forms the inner wall of the channel, $B^5$.

Between the end of the hub and the face of the box, E, a flat ring or washer, $E^2$, extends around the journal.

The part of the end wall, $B^3$, of the hub along the annular channel, $B^4$, extends outward farther than does the part of the end wall which bears against the end of the journal, $A^1$. Thus the outer face of the outer end of the hub is recessed or dished. Within the part of said end wall which bears against the journal is a port, G, extending through said wall. On the inner face of said wall a channel, $G^1$, extends from the port, G, to the channel, $B^4$. A plug, $G^2$, is screw threaded into the port, G. Said plug is preferably a tubular grease screw of any desired form suitable for the insertion of lubricant into the hub. The purpose of the channel, $G^1$, is to provide a passage for the grease from the port, G, to the channel, $B^4$, and thence into the spaces between the rollers, C, and the journal, $A^1$, and the liner, $B^2$, of the hub and outward between the journal and the ring, D, and between the inner end of the hub and the washer, $E^2$, and into the space between the outer face of the hub and the flange, $E^1$, of the axle boxing, E, and into the channel, $B^5$.

It will be observed that at times, while the wheel is rotating, there is strong pressure by the keys, $E^3$, against the adjacent upright face, $E^6$, of the annular flange or rib, $E^5$. Heretofore such pressure has caused wearing of said flange. According to my present improvement, this flange is made hard by "chilling." That is accomplished by placing in the mold a cold metal surface which forms one of the faces against which the molten metal rests when the mold is filled by pouring.

But while it is desirable to thus harden this flange, it is very desirable to avoid hardening the adjacent body of the hub to such extent as to make its inner face hard. In other words, the chilling is to be limited to the exterior of the hub. The reason for avoiding such interior hardening is that after the hub has been cast, its interior must be accurately and smoothly bored, and that work would be very difficult (substantially impossible) if that portion of the inner face of the hub were made hard by chilling. Consequently I have made provision for "chilling" the flange, $E^5$, in such manner as to prevent the chilling from extending through the interior face of the hub.

Figure 4:
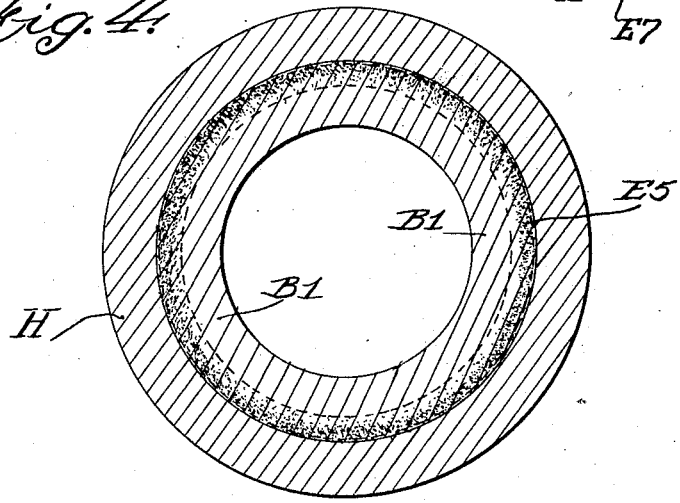
Fig. 4 is a horizontal section on the line, 4—4, of Fig. 3.

This method and operation are illustrated by Figs. 3 and 4. Fig. 3 shows a section of the mold with a part of the hub still in position in the mold. The inner end, $B^6$, of the hub, $B^1$, is made thicker than the part of the hub along the channel, $B^5$. The flange, $E^5$, is on the thicker part, $B^6$. Thus the distance from the outer or peripheral face, $E^7$, of the flange, $E^5$, to the interior face of the hub is made relatively large. Said peripheral face is slanting, the lower part being toward the inner end of the hub. A metal ring, H, rests on said peripheral face and has its lateral face, $H^1$, approximately even with the face, $E^6$, of the flange. Other adjacent faces of the hub lie against sand packed to form a part of the mold. Pouring metal into the mold thus formed will cause the chilling of a part of the flange, $E^5$, by contact with the chilling ring, H. But the parts are to be so proportioned as to substantially limit the chilling to the flange, $E^5$, none of the chilling extending inward through the hub wall to the adjacent inner face of the hub. It is essential that the face, $E^6$, of the flange, $E^5$, be chilled. Chilling the face, $E^7$, of the flange is immaterial. That results incidentally because the ring, F, is placed outside the flange, $E^5$, to attain distance from the interior face of the hub and also to make the ring removable when the hub is taken from the mold. Making the face, $E^7$, of the flange slanting, as above described, allows easy separation of the ring and the hub.

This ring, H, may be continuous—a single piece—and may be accurately turned and otherwise formed and may be placed into a mold an indefinite number of times.

Through the means above described, what has heretofore usually proven the weakest part of these wheel and axle box constructions is made strong and given durability without impairing any other part of the structure.

I claim as my invention:

1. The combination of a journal, a hub surrounding the journal and having near its inner end an external circumferential flange which is chilled while the adjacent interior part of the hub is not chilled, an axle box surrounding said journal and the inner end of the hub and said annular flange, and keys seated in the axle box tangentially to the hub and adjacent the face of said flange which is directed toward the outer end of the hub, substantially as described.

2. The combination of a journal, a hub surrounding the journal and having near its inner end an external circumferential flange having a slanting peripheral face and which flange is chilled while the adjacent interior part of the hub is not chilled, an axle box surrounding said journal and the inner end of the hub and said annular flange, and keys seated in the axle box tangentially to the hub and adjacent the face of said flange which is directed toward the outer end of the hub, substantially as described.

3. The combination of a journal, a hub surrounding the journal and having near its inner end an external circumferential flange which is chilled while the adjacent interior part of the hub is not chilled, and retaining means engaging the face of said flange which is directed toward the outer end of the hub, substantially as described.

In testimony whereof I have signed my name, this eleventh day of August, in the year one thousand nine hundred and twenty-five.

HUGH W. SANFORD.